April 1, 1947.   H. H. MEINCKE   2,418,271
FERTILIZER DISTRIBUTOR
Filed Aug. 14, 1944   4 Sheets-Sheet 1
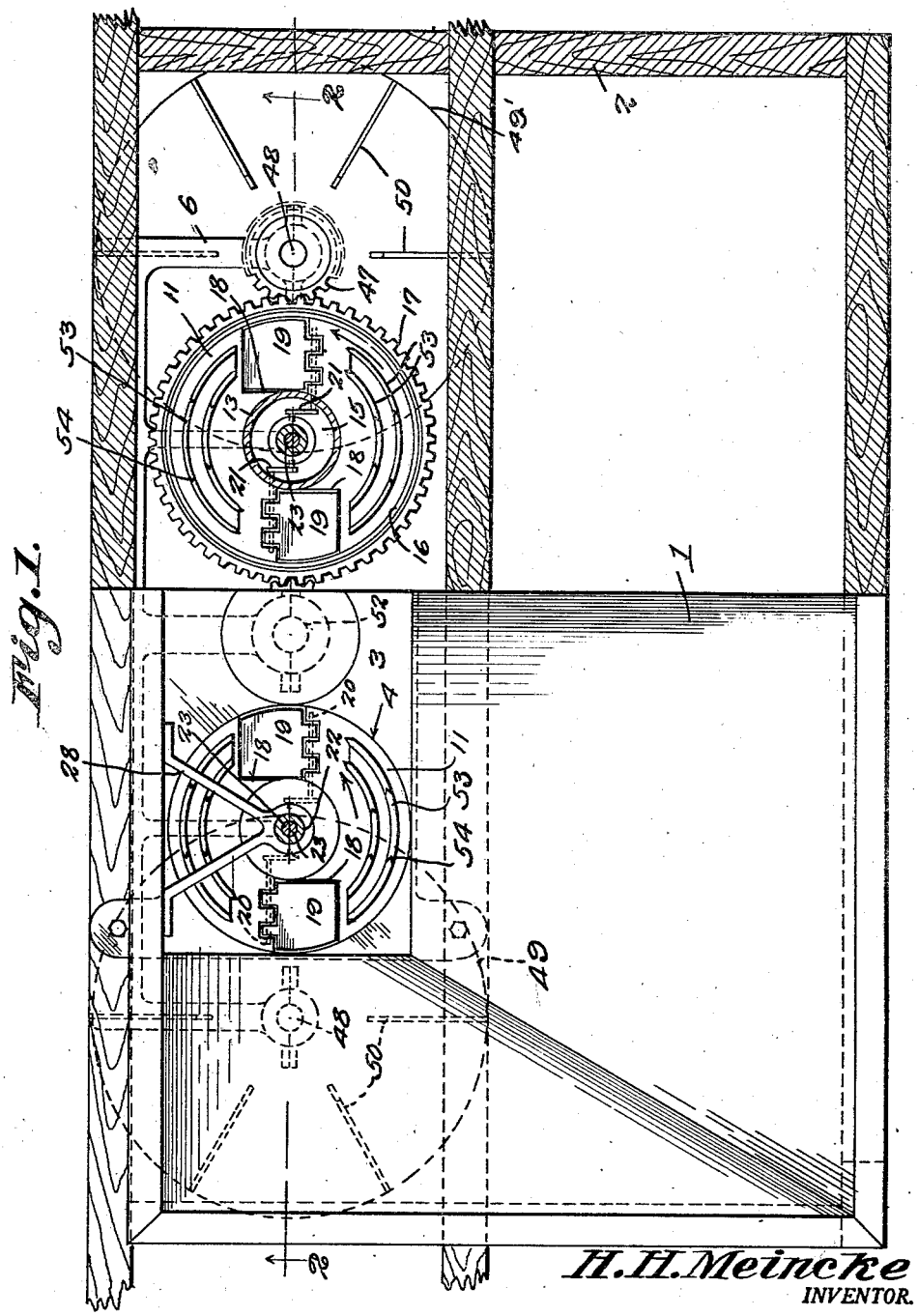
H. H. Meincke
INVENTOR.
BY
ATTORNEYS.

April 1, 1947.     H. H. MEINCKE     2,418,271
FERTILIZER DISTRIBUTOR
Filed Aug. 14, 1944     4 Sheets-Sheet 2
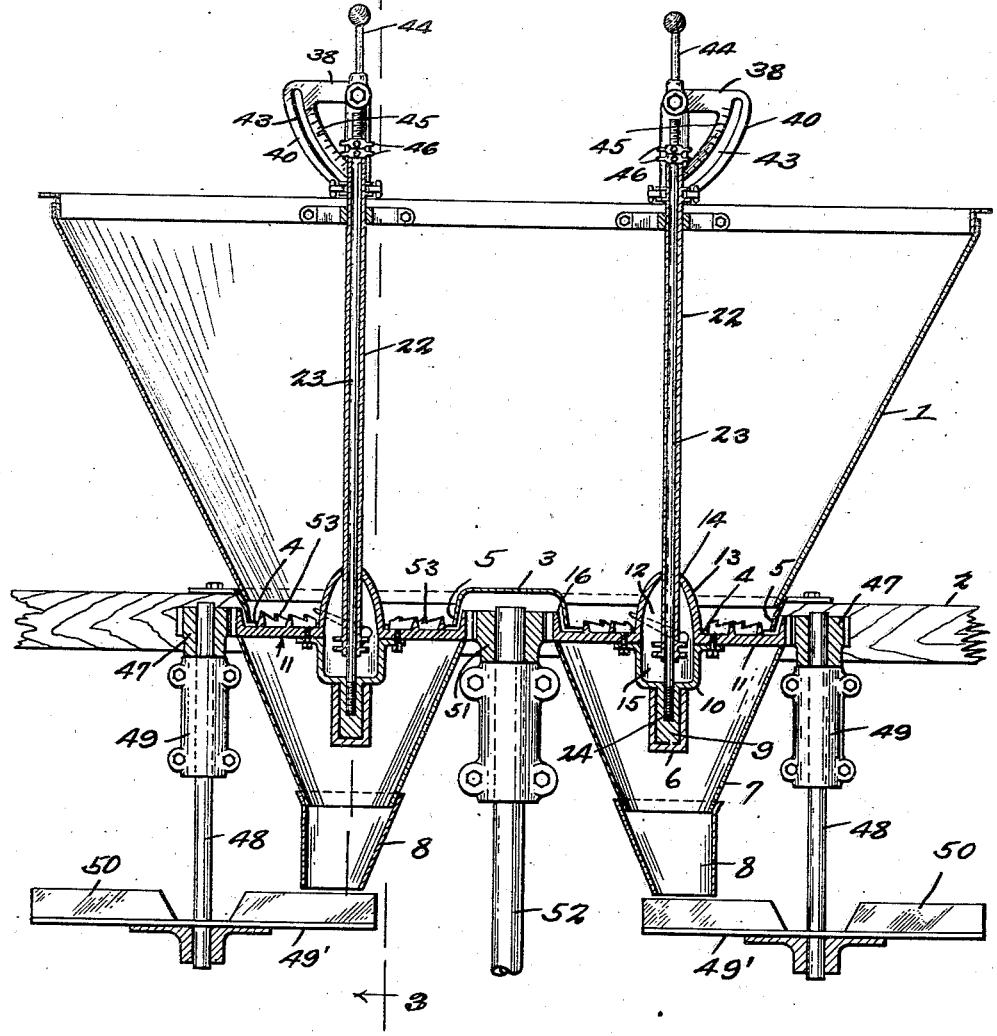
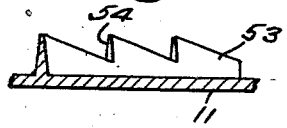
H. H. Meincke
INVENTOR.
BY
ATTORNEYS.

April 1, 1947.        H. H. MEINCKE        2,418,271
FERTILIZER DISTRIBUTOR
Filed Aug. 14, 1944        4 Sheets—Sheet 3

H. H. Meincke  INVENTOR.

BY
ATTORNEYS.

April 1, 1947.  H. H. MEINCKE  2,418,271
FERTILIZER DISTRIBUTOR
Filed Aug. 14, 1944  4 Sheets-Sheet 4
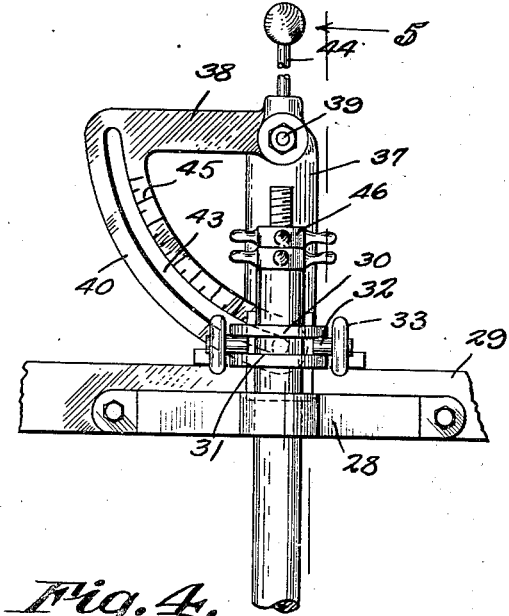
Fig. 4.
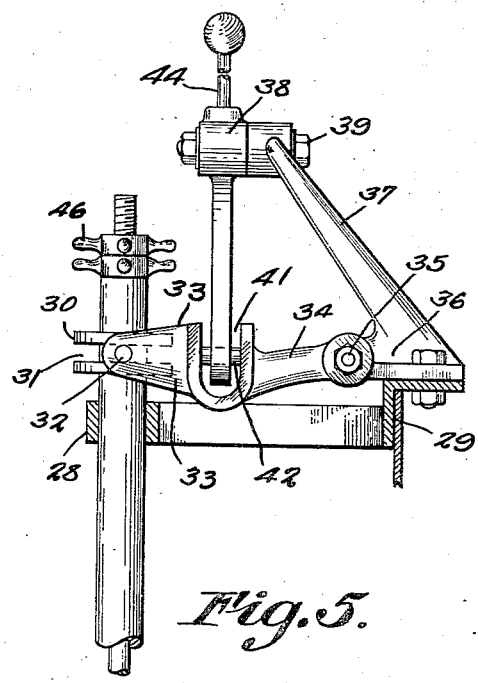
Fig. 5.
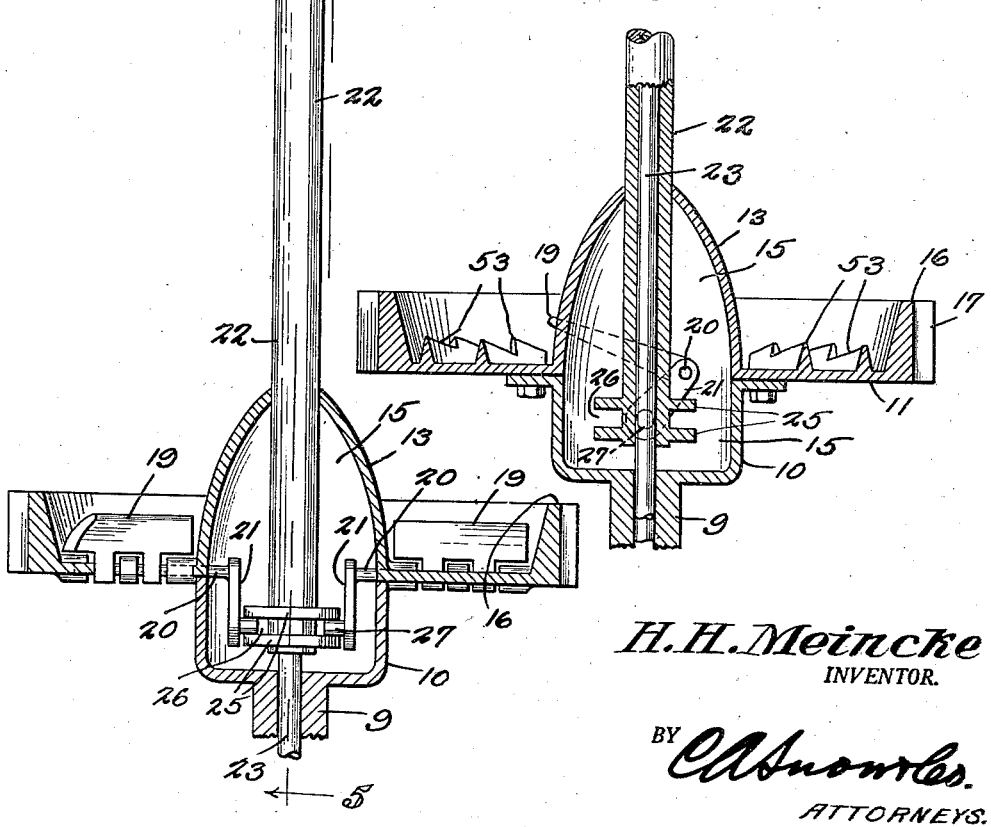
H. H. Meincke
INVENTOR.
BY C. A. Knowles
ATTORNEYS.

Patented Apr. 1, 1947

2,418,271

UNITED STATES PATENT OFFICE 2,418,271

FERTILIZER DISTRIBUTOR

Henry H. Meincke, Howey In The Hills, Fla.

Application August 14, 1944, Serial No. 549,348

6 Claims. (Cl. 275—8)

This invention relates to an apparatus designed primarily for distributing fertilizer, although obviously it might be used for distributing other comminuted or granular materials.

In practice the present invention has been found particularly adaptable for use in distributing commercial fertilizer in orchards. An object of the invention is to provide simple and efficient means for regulating the volume or "poundage" of material over a predetermined area.

With the foregoing and other objects in view which will appear as the description proceeds, the invention consists of certain novel steps in the method and certain details of construction and combinations of parts hereinafter more fully described and pointed out in the claims, it being understood that changes may be made in the method disclosed and in the construction and arrangement of parts without departing from the spirit of the invention as claimed.

In the accompanying drawings the preferred form of the invention has been shown.

In said drawings:

Figure 1 is a view partly in top plan view and partly in section showing a pair of distributing disks and the means employed for supplying material thereto.

Figure 2 is a section taken on line 2—2, Figure 1, the distributing disks being shown in elevation.

Figure 4 is an enlarged view partly in elevation and partly in section showing the feed control mechanism constituting one unit.

Figure 5 is a section through the lower portion of the unit, said section being on the line 5—5, Figure 4, the upper portion of the unit being shown in elevation.

Figure 6 is a side elevation of one of the agitating fins.

Figure 3:
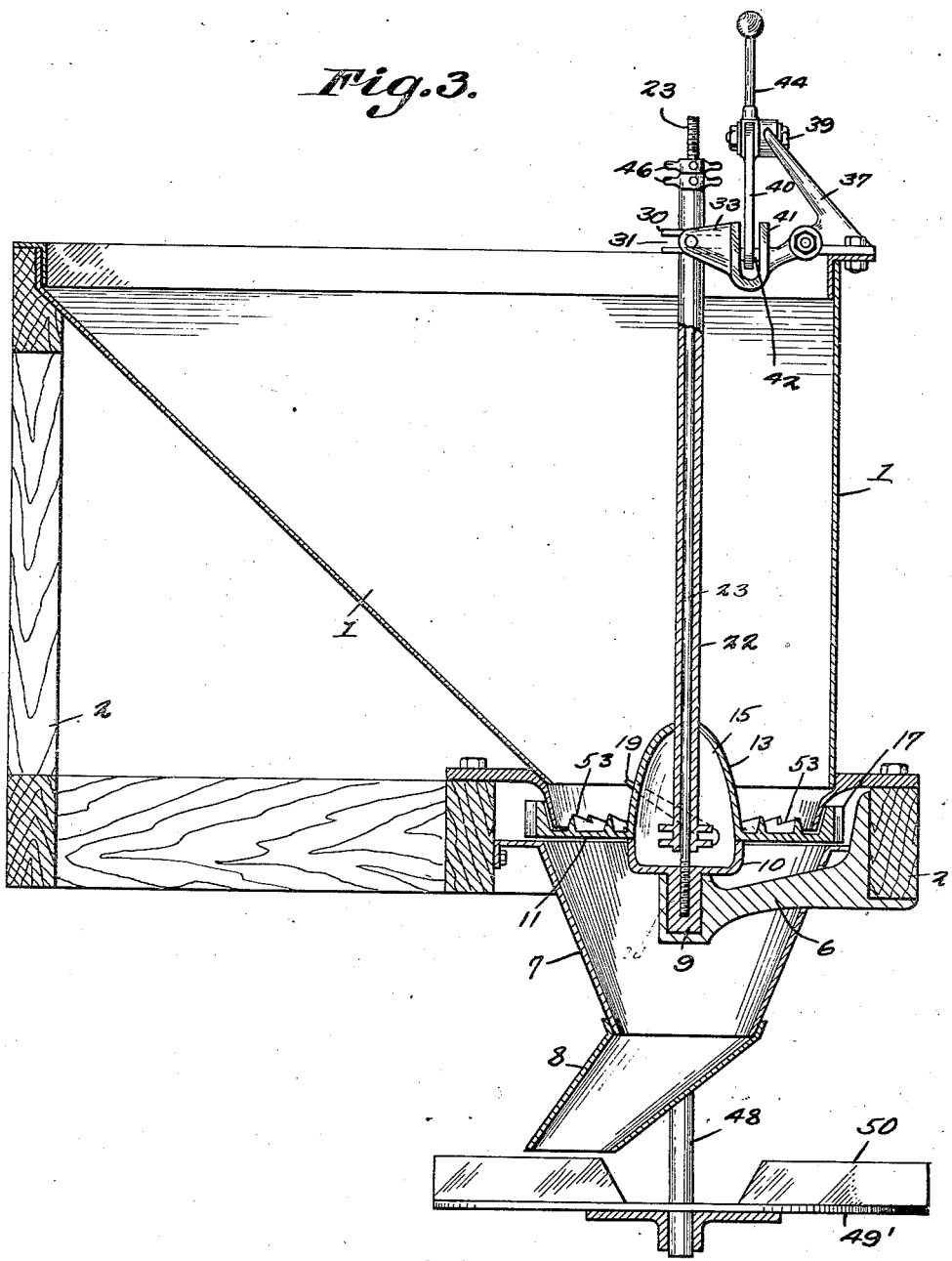
Figure 3 is an enlarged vertical section taken on line 3—3, Figure 2.

Referring to the figures by characters of reference I designates a hopper mounted on a supporting structure. This hopper can be of any suitable size and in the present instance is provided with a bottom plate 3 having spaced outlet openings 4 defined by depending flanges 5.

The supporting structure 2 is formed with bearing brackets 6 which are extended into fixedly supported funnels 7, each of which has a discharge spout 8 at the lower end thereof.

Journaled in each of the brackets 6 is a stud 9 preferably formed integral with and extended downwardly from a cup 10 which is concentric with and bolted or otherwise joined to the bottom surface of a disk 11. This disk has a central opening 12 registering with the interior of the cup 10 and surrounding the opening and extending upwardly therefrom is a housing section 13 having a central opening 14 in the top thereof. Thus the housing section 13 and the cup 10 cooperate to form a casing 15. The disk 11 is positioned close to the lower edge of the adjacent flange 5 and is concentric with the flange. Said disk has an upwardly extended rim 16 and an annular series of gear teeth are provided on the rim as shown at 17.

Diametrically opposed openings 18 are formed in the disk and hingedly connected to the disk at one end of each opening is a flat valve or deflecting blade 19 each extended away from its hinge in the direction of rotation of the disk. The hinge pin 20 of each blade is secured to the blade so as to move therewith and each of these hinge pins is journaled in the wall of casing 15 and has a crank arm 21 secured thereto and extended downwardly within casing 15. As shown in Figures 4 and 5 these crank arms of the opposed deflecting blades 19 are at opposite sides of a sleeve 22 which is slidably mounted on a rod 23 the lower end of which is anchored in the stud 9 as shown at 24. The lower portion of the sleeve has spaced annular collars 25 forming a groove 26 therebetween and extended into this groove are pins 27 extended from the respective crank arms 21. As the crank arms are inclined as shown in Figure 5 and the pins 27 are at all times away from a dead center relative to pins 20, it will be obvious that when the sleeve 22 is slid upwardly on rod 23 the arms 21 will be swung in such a direction as to move the blades 19 upwardly. Downward movement of sleeve 22 will result in the blades 19 swinging downwardly. Thus the positions of these blades can be readily and quickly changed simply by shifting the sleeve on rod 23.

The upper end of each sleeve 22 is slidably mounted on a bracket 28 fixedly joined to a portion of the supporting structure 29 which, with the structure 2 heretofore referred to, can form a part of the body of a fertilizer distributing machine or the like. A collar 30 having an annular groove 31 is carried by the upper portion of sleeve 22 and extended into opposed portions of the collar are pins 32 carried by a fork 33 which loosely straddles the collar 30. This fork is formed at one end of a lever 34 fulcrumed, as at 35 on the base 36 of a bracket 37. An arm 38 is pivotally joined to the upper end of the bracket as indicated at 39 and has a depending longitudinally slotted segment 40 concentric with the pivot 39 and movably mounted within a recess 41 in lever 34. A pin 42 bridges the recess and is mounted in the lever and this pin is extended loosely through the slot 43 in the segment 40.

A handle 44 is fixedly connected to and extends away from the arm 38 and by means thereof said arm can be swung on a pivot 39 to raise or lower the arm 38 and the slotted segment 40. This action will, of course, result in the segment raising or lowering the pins 32 and the collar 30 with the result that motion will be transmitted through the sleeve 22 and crank arms 21 to the blades 19 which will be raised or lowered. The extent of movement in each of the segmental members 40 can be determined by means of graduations 45 formed on the slotted segment. Upward movement of the sleeve 22 on the rod 23 can be limited by nuts 46 constituting stops.

The gear teeth 17 mesh with a driven gear 47 geared to the upper end of a shaft 48 suspended within a bearing 49 and provided at its lower end with a broadcasting or distributing disk 49'. This disk is provided on its upper surface with radial fins 50 and the disk is so located that the peripheral portion thereof moves directly beneath the outlet spout 8 located beneath one of the funnels 7.

In the structure illustrated two disks 11 have been provided each with its delivery funnel and spout and two of the scattering disks 49' have been used, one for each funnel 8. Each disk 11 drives a gear 47 and the two disks 11, in turn, are driven by an intermediate or drive gear 51 carried by a drive shaft 52 receiving power from any suitable source.

Formed on or secured to the top surface of each of the disks 11 are opposed arcuate fins 53, the upper edge of each fin being formed with teeth 54 so positioned that as the disk rotates in one direction, these teeth will plow into and through bulk material piled on the disk so as to break it up and prepare it for delivery. Any desired number of these toothed fins or breakers can be used on each disk and they are preferably located between the openings in the disks.

In practice the material to be delivered is deposited in the hopper 1 and will gravitate to openings 4 onto the respective disks 11. By shifting handle 44 the slotted segments 40 can be actuated to move the sleeves 22 upwardly or downwardly, thereby to raise or lower the blades or valves 19. The rotating gear 51 will drive the two disks 11 and these, in turn, will operate the disks 49'. As the disks 11 rotate in the direction in which the blades 19 are extended, it will be apparent that these blades will cut through the bulk material and deflect it downwardly through the openings 18 from which it will fall into the funnels 7 to the spouts 8 and thence on to the rapidly rotating disks 49'. Here the blades 50 will throw the material outwardly so that it will be distributed as desired.

Obviously, the amount of material delivered through the disks will be controlled by the adjustment of the blades 19 and this amount can be determined by referring to the graduations 45 on the segments 40.

What is claimed is:

1. A distributor for fertilizer or the like, including a rotatable disk positioned to support bulk material and having a discharge aperture therethrough, a distributing disk positioned to receive material discharged through the opening, means for transmitting motion between the disks, means for driving one of the disks, a deflector on the apertured disk adjacent to the opening therein, and means for adjusting the deflector toward or from the plane of rotation of the apertured disk during the rotation of the disks, said deflector being positioned to deflect downwardly through the apertured disk the bottom portion of the bulk material supported on the disk.

2. A distributor for fertilizer or the like including a container having a bottom outlet, a disk mounted for rotation at the outlet and having an aperture, a deflecting blade hingedly connected to the disk and overlying the aperture, said blade being extended in the direction of rotation of the disk and mounted for swinging movement toward and from the plane of rotation of the apertured disk, a rod rotatable with the disk, a sleeve slidably mounted thereon, and means operated by the sliding movement of the sleeve for swinging the blade toward or from the disk while the disk is rotating.

3. A device of the class described including a container for bulk material having a bottom outlet, a rotatable disk below and coaxial with the outlet, said disk having openings, toothed fins on the disk between the openings, constituting breakers, deflecting blades hingedly connected to the disk between the fins and overlying the respective openings, and means for simultaneously swinging the blades toward or from the openings during the rotation of the disk, said fins being positioned to break up bulk material in the plane of movement of the blades with the disk.

4. A device of the class described including a container for bulk material having a bottom outlet, a rotatable disk below and coaxial with the outlet, said disk having openings, toothed fins on the disk between the openings, constituting breakers, deflecting blades hingedly connected to the disk between the fins and overlying the respective openings, said blades being mounted to swing toward or from the plane of rotation of the disk and means for simultaneously swinging the blades from the disk during the rotation of the disk thereby to deflect downwardly the bottom portion of the bulk material above the disk, said means including a central casing on the disk, crank arms therein connected to the pivot ends of the respective blades, a sleeve slidable in the casing and coaxial with the disk, said sleeve having an annular groove, means on the arms projecting into the groove, and means for raising and lowering the sleeve to shift the arms.

5. A device of the class described including a container for bulk material having a bottom outlet, a rotatable disk below and coaxial with the outlet, said disk having openings, toothed fins on the disk between the openings, constituting breakers, deflecting blades hingedly connected to the disk between the fins and overlying the respective openings, said blades being mounted to swing toward or from the plane of rotation of the disk, the toothed fins being positioned in the plane of rotation of the blades, thereby to break up bulk material in the path of rotation of the blades and means for simultaneously swinging the blades from the disk during the rotation of the disk, said means including a central casing on the disk, crank arms therein connected to the hinge ends of the respective blades, a rod coaxial with the disk and casing and extending thereabout, a sleeve slidable on the rod and in the casing, and cooperating means in the casing and on the sleeve and arms for shifting the arms during the rotation of the sleeve when the sleeve is moved longitudinally.

6. A device of the class described including a container for bulk material having a bottom outlet, a rotatable disk below and coaxial with the outlet, said disk having openings, toothed fins on the disk between the openings, constituting breakers, deflecting blades hingedly connected to the disk between the fins for up and down movement relative to the plane of rotation of the disk and overlying the respective openings, said blades being mounted to swing toward or from the plane of rotation of the disk, the toothed fins being positioned in the plane of rotation of the blades, thereby to break up bulk material in the path of rotation of the blades, and means for simultaneously swinging the blades from the disk during the rotation of the disk, said means including a central casing on the disk, crank arms therein connected to the hinge ends of the respective blades, a rod coaxial with the disk and casing and extending therein, a sleeve slidable on the rod and in the casing, and cooperating means in the casing and on the sleeve and arms for shifting the arms during the rotation of the sleeve when the sleeve is moved longitudinally, a forked lever rotatably engaged by the sleeve, a concentric segmental member movably connected to said lever, and a handle for shifting said member to move the lever and slide the sleeve.

HENRY H. MEINCKE.

REFERENCES CITED

The following references are of record in the file of this patent:

UNITED STATES PATENTS

| Number | Name | Date |
|---|---|---|
| 2,102,619 | Francis | Dec. 21, 1937 |

FOREIGN PATENTS

| Number | Country | Date |
|---|---|---|
| 391,691 | France | Sept. 3, 1908 |